(12) United States Patent
Litkouhi et al.

(10) Patent No.: US 10,759,415 B2
(45) Date of Patent: Sep. 1, 2020

(54) EFFECTIVE ROLLING RADIUS

(71) Applicant: GM GLOBAL TECHNOLOGY OPERATIONS LLC, Detroit, MI (US)

(72) Inventors: Bakhtiar B. Litkouhi, Washington, MI (US); Jin-Woo Lee, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 458 days.

(21) Appl. No.: 15/440,725

(22) Filed: Feb. 23, 2017

(65) Prior Publication Data
US 2018/0237000 A1 Aug. 23, 2018

(51) Int. Cl.
| | | |
|---|---|---|
| *B60W 30/02* | (2012.01) | |
| *G01S 19/14* | (2010.01) | |
| *G01S 19/48* | (2010.01) | |
| *G01S 19/49* | (2010.01) | |
| *B60W 10/04* | (2006.01) | |
| *B60W 10/10* | (2012.01) | |
| *B60W 10/20* | (2006.01) | |
| *B60W 40/12* | (2012.01) | |
| *G01S 19/42* | (2010.01) | |
| *G01S 19/52* | (2010.01) | |

(52) U.S. Cl.
CPC ............ *B60W 30/02* (2013.01); *B60W 10/04* (2013.01); *B60W 10/10* (2013.01); *B60W 10/20* (2013.01); *B60W 40/12* (2013.01); *G01S 19/14* (2013.01); *G01S 19/42* (2013.01); *G01S 19/48* (2013.01); *G01S 19/49* (2013.01); *G01S 19/52* (2013.01); *B60W 2420/42* (2013.01); *B60W 2420/52* (2013.01); *B60W 2420/54* (2013.01); *B60W 2530/20* (2013.01); *B60W 2720/10* (2013.01)

(58) Field of Classification Search
CPC ...... B60W 10/04; B60W 10/10; B60W 10/20; B60W 40/12; G01S 19/14; G01S 19/42; G01S 19/48; G01S 19/52
USPC .......................................................... 701/48
See application file for complete search history.

(56) References Cited

U.S. PATENT DOCUMENTS

| | | | |
|---|---|---|---|
| 6,324,446 B1 * | 11/2001 | Brown ...................... | B60T 7/12 180/282 |
| 8,108,104 B2 * | 1/2012 | Hrovat ............... | B60G 17/0162 180/209 |
| 9,754,490 B2 * | 9/2017 | Kentley ............. | G06K 9/00805 |

(Continued)

*Primary Examiner* — Thomas G Black
*Assistant Examiner* — Luat T Huynh
(74) *Attorney, Agent, or Firm* — Lorenz & Kopf, LLP

(57) ABSTRACT

Systems and method are provided for controlling a vehicle. In one embodiment, a method includes receiving, via a processor, image data of a surroundings of the vehicle. The method includes performing, via a processor, image analysis on the image data to identify road features. The method includes matching, via a processor, the identified road features to road features in a predetermined map to determine matched road features. The method includes determining, via a processor, global positioning data for the vehicle based on global positioning data in the predetermined map and the matched road features. The method also includes calibrating, via a processor, effective rolling radius of a wheel of the vehicle based at least on the global position data. The method further includes controlling, via a processor, a function of the vehicle based, in part, on the effective rolling radius.

15 Claims, 5 Drawing Sheets

(56) References Cited

U.S. PATENT DOCUMENTS

| | | | |
|---|---|---|---|
| 2006/0253240 A1* | 11/2006 | Rao | B60W 50/0205 |
| | | | 701/48 |
| 2012/0022780 A1* | 1/2012 | Kulik | G01C 21/28 |
| | | | 701/498 |
| 2017/0016740 A1* | 1/2017 | Cui | G01C 21/30 |
| 2017/0023441 A1* | 1/2017 | Luk | G01M 17/02 |
| 2018/0107215 A1* | 4/2018 | Djuric | G01C 21/26 |

* cited by examiner

EFFECTIVE ROLLING RADIUS

TECHNICAL FIELD

The present disclosure generally relates to estimating effective rolling radius of one or more wheels of vehicles, especially in autonomous or semi-autonomous vehicles, and more particularly relates to systems and methods for estimating effective rolling radius and calculating vehicle velocity based thereon.

BACKGROUND

Some vehicles are capable of sensing their environment and localizing the vehicle based on the sensed environment. Such vehicles sense their environment using sensing devices such as radar, lidar, visual image sensors, and the like. Some vehicles further use information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Such vehicles may include localization capabilities.

Effective rolling radius of a wheel of a vehicle is a distance from a center of the wheel to an outer surface of tread of the wheel. The effective rolling radius varies with weight of the vehicle (e.g. due to occupancy and load of vehicle), wheel temperature (e.g. due to environmental temperature and also due to frictional heating of wheels), pressure, wear, road conditions, etc. The effective rolling radius can be used in a number of input parameters for vehicle control. As such, precision of vehicle control is dependent on accuracy of the effective rolling radius parameter.

Accordingly, it is desirable to provide systems and methods that can accurately estimate effective rolling radius for use in vehicle control operations. Furthermore, other desirable features and characteristics of the present invention will become apparent from the subsequent detailed description and the appended claims, taken in conjunction with the accompanying drawings and the foregoing technical field and background.

SUMMARY

Systems and method are provided for disseminating accurate information to or controlling a vehicle. In one embodiment, a system is provided for controlling a function of a vehicle. The system includes a positioning module configured to receive image data of a surroundings of the vehicle and to determine global positioning data for the vehicle based on an analysis of the image data, via the processor. A wheel calibration module configured to estimate effective rolling radius of a wheel of the vehicle based on the global position data, via a processor. A vehicle control system is configured to control a function of the vehicle based, in part, on the effective rolling radius.

In embodiments, the image data includes lidar image data, radar image data, ultrasound image data, visual image data, stereoscopic camera image data, camera image data or a fusion of at least two thereof.

In embodiments, the positioning module is configured to identify road features based on the analysis of the image data.

In embodiments, the positioning module is configured to match the identified road features with road features in a predetermined map or data set.

In embodiments, the predetermined map correlates global positioning system, GPS, data with image data that includes images of road features.

In embodiments, the positioning module utilizes a feature matching algorithm that compares road features in images of the predetermined map with identified road features.

In embodiments, the feature matching algorithm uses a point cloud or pixel based comparison technique, an extracted feature comparison technique or a combination thereof.

In embodiments, the wheel calibration module is configured to receive revolution data for the wheel and to determine the effective wheel radius based on the revolution data and the global position data.

In embodiments, the wheel calibration module is configured to determine a distance moved by the wheel between first and second vehicle positions based on the global position data and a number of revolutions of the wheel over the distance moved. The wheel calibration module is configured to estimate effective rolling radius of the wheel based on the distance moved and the number of revolutions.

In embodiments, the positioning module is configured to receive global positioning system, GPS, data representing a GPS position of the vehicle and is configured to refine the GPS position of the vehicle based on localization data determined from the image analysis.

In embodiments, the positioning module is configured to triangulate or directly determine the relative vector of vehicle and the road feature a position of the vehicle relative to road features through the analysis of the image data as part of determining localization data. The positioning module is configured to register road features of the image data with road features in a predetermined map to determine registration data and to locate the vehicle in the predetermined map based on the localization data and the registration data to allow determination of the global positioning data for the vehicle.

In embodiments, the positioning system is configured to calculate velocity of the vehicle using the effective rolling radius and a number of revolutions of the wheel. The vehicle control system is configured to control the function of the vehicle based, in part, on the calculated velocity.

The vehicle control system is configured to control, based on the effective rolling radius, one or more of: a steering control actuator, a shifter control actuator, a throttle control actuator, a brake control actuator and a speed user interface.

In another embodiment, a vehicle is provided. The vehicle includes a sensor system configured to obtain image data of a surroundings of the vehicle. A positioning module is configured to determine global positioning data for the vehicle based on an analysis of the image data, via a processor. A wheel calibration module is configured to estimate effective rolling radius of a wheel of the vehicle based at least on the global position data, via a processor. A vehicle control system is configured to control a function of the vehicle based on the effective rolling radius.

In embodiments, the sensor system includes a global position system, GPS, receiver configured to determine global positioning system data, wherein the positioning module is configured to refine the GPS data based on the image analysis to determine the global positioning data.

In embodiments, the image analysis identifies road features in the image data, and determines localization data representing a location of the vehicle relative to the road features. The positioning module is configured to match the identified road features with road features in a predetermined map that correlates global position data with road features. The positioning system is configured to determine the global position data based on the matched road features and the localization data.

In embodiments, the sensor system includes a wheel encoder configured to count revolutions of the wheel to thereby determine count data. The wheel calibration module is configured to estimate effective rolling radius from a distance that the wheel has moved between first and second locations using the global position data and a number of revolutions of the wheel between the first and second locations using the count data.

In yet another embodiment, a method of controlling a function of a vehicle is provided. The method includes receiving, via a processor, image data of a surroundings of the vehicle. The method includes performing, via a processor, image analysis on the image data to identify road features. The method includes matching, via a processor, the identified road features to road features in a predetermined map to determine matched road features. The method includes determining, via a processor, global positioning data for the vehicle based on global positioning data in the predetermined map and the matched road features. The method also includes calibrating, via a processor, effective rolling radius of a wheel of the vehicle based at least on the global position data. The method further includes controlling, via a processor, a function of the vehicle based, in part, on the effective rolling radius.

In embodiments, the method includes triangulating, trilateration or otherwise calculating a position of the vehicle relative to identified or matched road features to obtain localization data and determining the global positioning data based on the matched road features, the localization data and global positioning data in the predetermined map.

In embodiments, the method includes identifying the road features through a neural network.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The present disclosure is described primarily in the context of high level autonomous vehicles. It should be appreciated, however, that the systems and methods for estimating and using effective rolling radius as described herein can be used in a variety of degrees of autonomous vehicles, from autonomous vehicle level zero, no automation, to autonomous vehicle level five.

Figure 1:
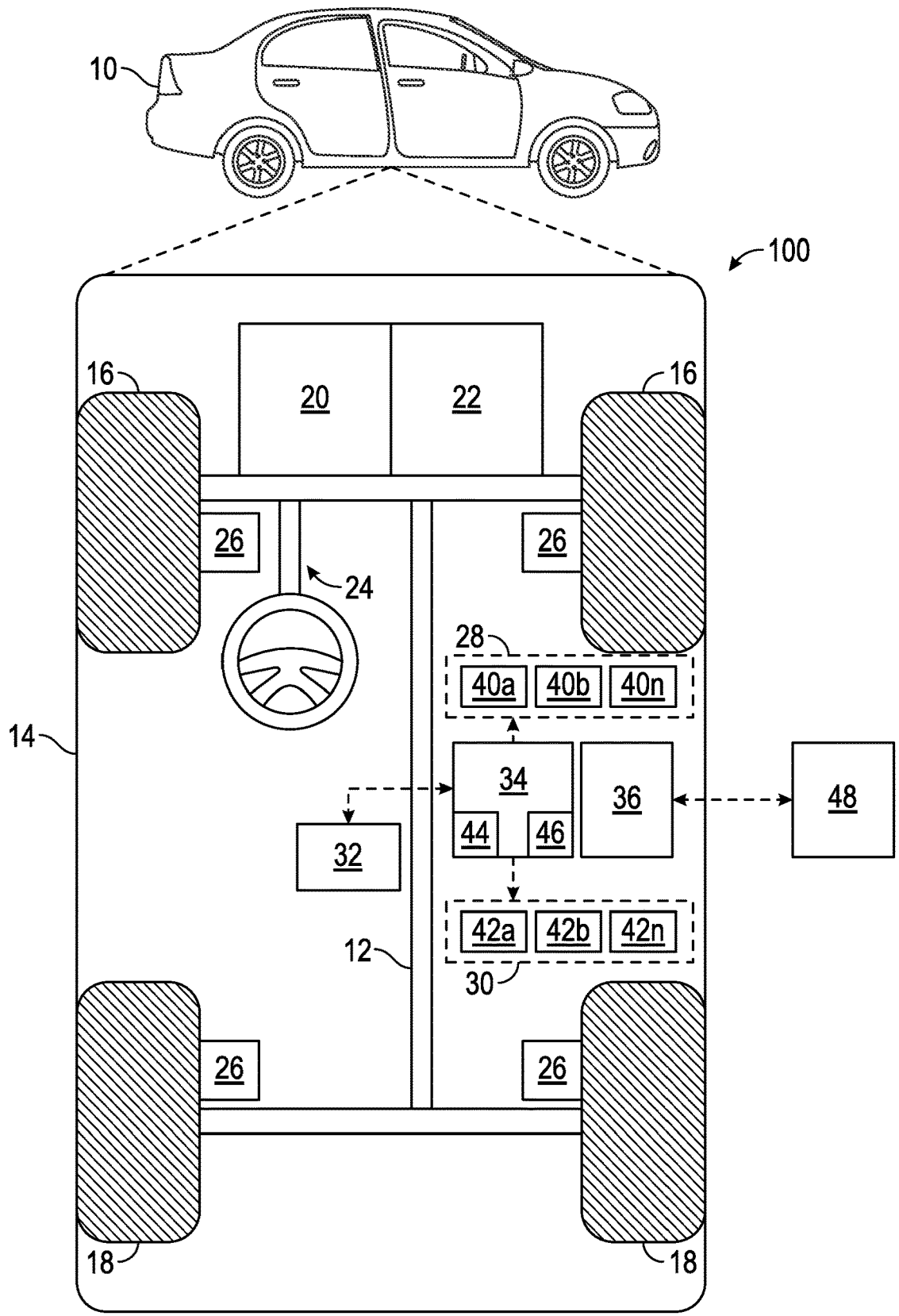
FIG. 1 is a functional block diagram illustrating a vehicle having a system that estimates effective rolling radius, in accordance with various embodiments.

With reference to FIG. 1, a system that estimates effective rolling radius for use in vehicle control is shown generally at 100 is associated with a vehicle 10 in accordance with various embodiments. In general, the system 100 estimates effective rolling radius based on global position data that has been determined through image analysis of surroundings to provide refined positional resolution for the vehicle 10 as compared to global positioning system, GPS, data. Such refined positional resolution is useful for accurately tracking motion of the vehicle 10 between first and second locations to determine a distance moved by the vehicle 10. In combination with a number of counts of the wheels of the vehicle in traversing the distance between the first and second locations, the effective rolling radius can be estimated. The effective rolling radius is used as an input parameter to a vehicle control system 80, as described later herein with respect to FIG. 2.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle in that at least some functions are executed using autonomous systems and the system 100 is incorporated into the vehicle 10. The vehicle 10 may be an autonomous vehicle classified in the range from level zero to level five on the SAE International scale. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, the system 100 disclosed herein can be implemented for any level of automation (or non-automated systems) and is not limited to the present examples. Although described in terms of such a level of autonomy, the vehicle 10 is not required to be highly automated according to the teachings herein. The systems and methods for estimating effective rolling radius described herein, in embodiments, require at least a vehicle able to sense its environment, localize the vehicle, estimate effective rolling radius based on such localization and to execute at least one vehicle control function based on the effective rolling radius, irrespective of a level of automation of the vehicle. Accordingly, the description of automated vehicle control that follows should be understood as being exemplary in nature.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, wheel encoders and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling at least one component of the vehicle 10, and generate control signals to the actuator system 30 to automatically control the at least one component of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the system 100 and, when executed by the processor 44, estimate effective rolling radius of wheels 18 of the vehicle 10 by determining global position data for the vehicle through image processing of images of surroundings of the vehicle 10 and controls one or more functions of the vehicle 10 based thereon.

Figure 2:
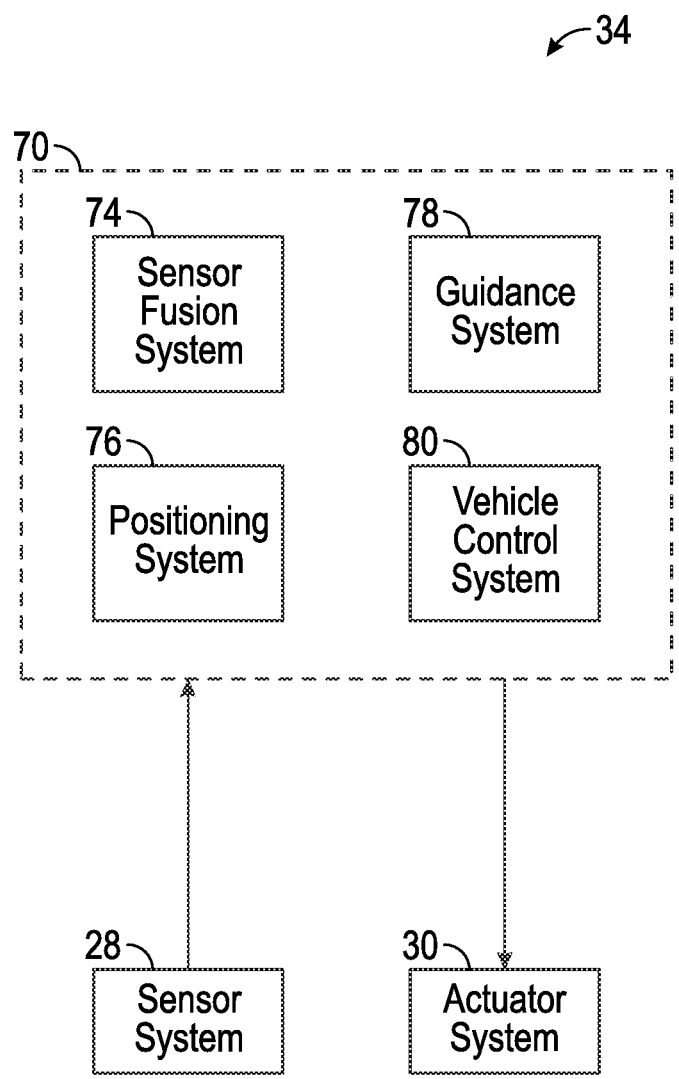
FIG. 2 is a dataflow diagram illustrating a driving system that includes the system that estimates effective rolling radius in the vehicle, in accordance with various embodiments.

In accordance with various embodiments, controller 34 implements an autonomous driving system (ADS) 70 as shown in FIG. 2. The autonomous driving system 70 is able to automate at least one function of the vehicle 10. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the system 100 of FIG. 1 is included within the autonomous driving system 200, for example, as part of the positioning system 76 and the vehicle control system 80, as will follow from the below discussion of FIGS. 4 to 6. Although described herein particularly with regard to the autonomous driving system 70, it should be understood that the system 100 described herein can be included in other vehicle architectures.

Figure 3:
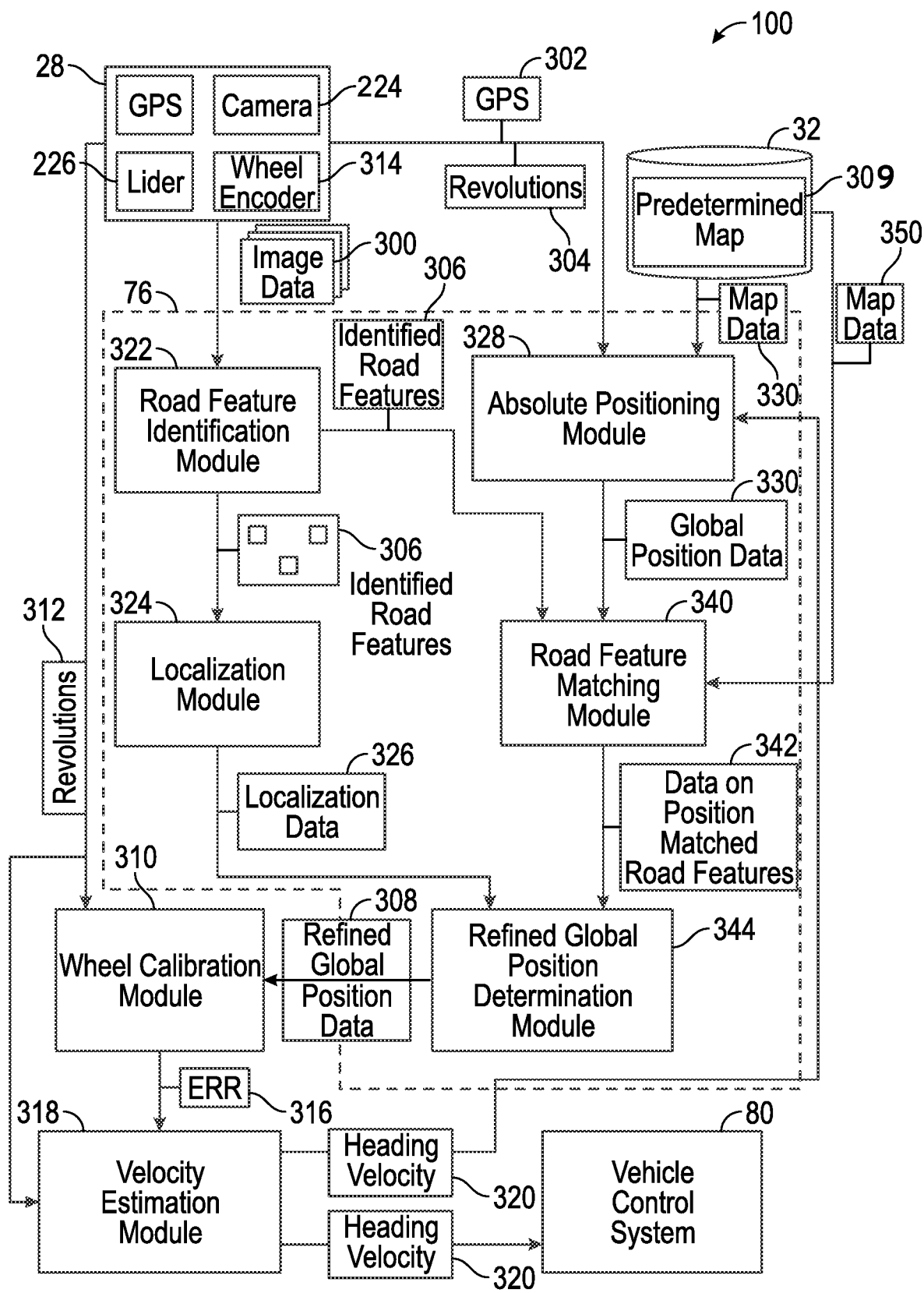
FIG. 3 is a dataflow diagram illustrating a system that estimate effective rolling radius and uses the effective rolling radius in at least one vehicle control function for a vehicle, in accordance with various embodiments
Figure 4:
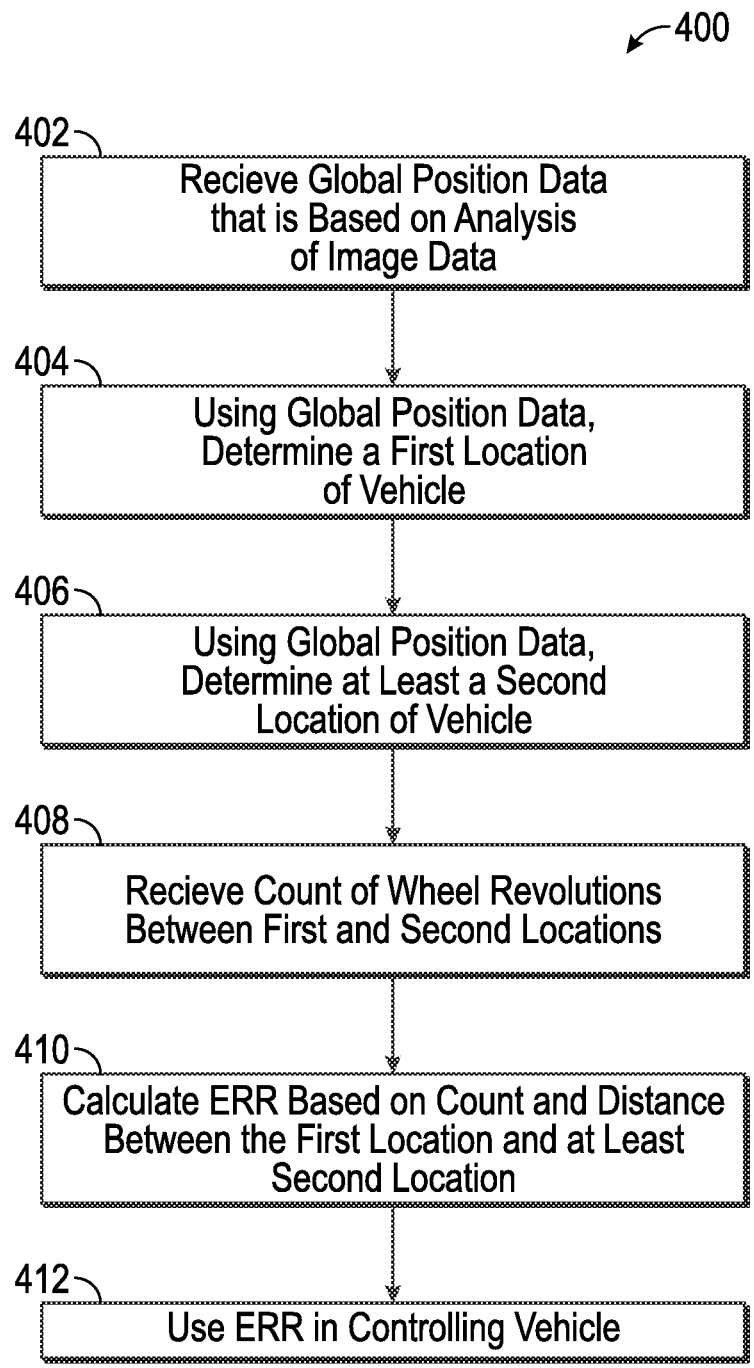
FIG. 4 is a flowchart illustrating a method for estimating effective rolling radius and controlling a vehicle, in accordance with various embodiments.

For example, as shown in more detail with regard to FIG. 3 and with continued reference to FIG. 4, the system 100 includes a/the positioning system 76. In various embodiments, the positioning system 76 is configured to receive sensor data from the sensor system 28 including image data 300, GPS data 302 and wheel revolutions data 304. The positioning system 76 is configured to determine a global position of the vehicle 10 by image processing the image data 300 to identify road features 306 and to match the identified road features 306 in a predetermined map 309 correlating the road features with global position data. In this way, the positioning system 76 is configured to output refined global position data 308 that is used to calibrate wheel effective rolling radius. Exemplary modules for implementing aspects of the positioning system 76 are described in further detail below.

In various embodiments, the system 100 includes a wheel calibration module 310 configured to track motion of the vehicle 10 based on the refined global position data 308 and a count of number of revolutions 312 of each wheel of the vehicle during the vehicle motion. Based on these input parameters 308, 312, effective rolling radius 316 for each wheel can be determined by the wheel calibration module 310. The vehicle motion may be determined from first and at least a second location of the vehicle 10 established based on the refined global position data 308. In embodiments, more than two location points may be established based on the refined global position data 308 for use in determining effective rolling radius 316. For example, a dense sampling of the refined global position data 308 can be taken to accurately track distance moved by the vehicle 10. The count of number of revolutions can be received from a wheel encoder 314 associated with each wheel 16, 18. The wheel encoder 314 may return at least 10, 100 and even 1000 data points per revolution.

In various embodiments, such as for straight roads, the wheel calibration module uses just two samples of the global position data 308 to determine distance travelled. In various embodiments, such as for curved roads, high resolution sampling of the global position data 308 is used, combined with curve fitting to determine distance travelled. In additional or alternative embodiments, a navigation map, such the predetermined map 308, could be accessed to allow accurate tracking of the distance travelled by tracking vehicle motion in the navigation map based on more than one sampling of global position data 308.

In embodiments, the wheel calibration module 310 determines the effective rolling radius R 316 for each wheel using, for example, the equation:

$$R = D/(N \times 2 \times \pi) \qquad (1)$$

where N is a number of revolutions of the wheel read from the wheel encoder 314 and D is a distance travelled determined from the refined global position data 308. In embodiments, N is a rational number.

In various embodiments, the system 100 includes a velocity estimation module 318 configured to estimate velocity 320 of the vehicle 10 based on the effective rolling radius 316 and a number of revolutions 312 of each wheel. The velocity estimation module 318 can fuse the number of revolutions for each wheel 16, 18 and the associated effective rolling radius 316 for each wheel 16, 18 in estimating heading velocity 320 for the vehicle 10. In embodiments, the velocity of the vehicle 10 is estimated by the velocity estimation module 318 using, for example, the following relationship:

$$v = \frac{N \times 2 \times \pi \times R}{t} \quad (2)$$

where t is time and v is heading velocity 320. The velocity 320 may be determined on a wheel by wheel basis and then fused (e.g. averaged) or the number of revolutions and the effective rolling radius may be fused in a single velocity calculations.

In various embodiments, the system 100 includes a vehicle control system 80 configured to control one or more functions of the vehicle 10 based on the heading velocity 320. In other embodiments, the effective rolling radius 316 can be directly used by the vehicle control system 80 for vehicle control purposes. The vehicle control system 80 can use the estimated heading velocity 320 in communicating vehicle speed and/or fuel economy to a user through a user interface such as a display panel as one exemplary vehicle control feature. In another example, the vehicle control system 80 is configured to determine one or more actuator commands based on the heading velocity including, but not limited to, a steering command, a shift command, a throttle command, and a brake command. Another exemplary control function utilizing the effective rolling radius determined as described herein is to display or otherwise communicate vehicle velocity to a passenger or driver.

In embodiments, actuator commands are communicated to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

In various embodiments, the vehicle control system 80 is configured to execute a dead reckoning calculating based, in part, on the heading velocity 320, which calculation is used in further automated vehicle control features.

FIG. 3 shows an exemplary arrangement of modules of the positioning system. This is but one exemplary modular configuration for determining global positioning data of vehicles based on imaging surroundings of the vehicle and matching of road features in a predetermined map.

The positioning system 76 includes, in the exemplary embodiment, a road feature identification module 322. The road feature identification module 322 is configured to receive image data 300, analyze the image data 300 to identify road features and to output identified road features 306. The image data 300 can be lidar, radar, ultrasound and/or optical camera images. In exemplary embodiments, the image data 300 is optical camera images from one or more optical cameras 224 of the sensor system 28 and/or lidar images from one or more lidar devices 226 of the sensor system.

The road feature identification module 322 is configured to identify a variety of road features including any one or combination of road signs, road intersections, road curvatures, road lanes, road markings, road infrastructure (e.g. street lighting, traffic lights, traffic information signs, bridges), buildings, natural landmarks, road topology, etc. The road identification module 322 performs road feature identification through analysis of the image data 300. The analysis includes feature detection and classification. The image analysis may include one or more image filtration and feature segmentation processes as well as feature classification. In embodiments, the image analysis uses a neural network for identifying road features or other artificial intelligence based methods. More direct image analysis may also be utilized.

The road feature identification module is configured to output data representing the identified road features 306. The output road feature identification data 306 may include geometry, local position in the image space of the image data 300, feature classification and other information.

In various embodiments, the system 100 includes a localization module 324 configured to determine localization data 326 representing a relative position of the vehicle 10 and the identified road features 306. In particular, three dimensional coordinates representing the location of the vehicle 10 relative to the road features 306 are determined by the localization module 324. In addition, the orientation of the vehicle relative to the identified road features 306 may be incorporated into the localization data 326. In various embodiments, the localization module uses geometric calculations in order to determine the localization data 326.

In various embodiments, the system 100 includes an absolute positioning module 328 and a predetermined map 308 stored on data storage device 32. The absolute positioning module 328 is configured to determine global positioning data 330 representing a global location of the vehicle 10. The global position data 330 may be global positioning system, GPS, coordinates. The absolute positioning module 328 may determine the global position data using GPS data 302 from the GPS receiver of the sensor system 28. When GPS data 302 is not available, the absolute positioning module 328 is configured to estimate the global position data 330 based, for example, on most recently available GPS data 302 and/or most recently detected feature used for localization of the vehicle 10, and a dead reckoning calculation to an estimated current location to the most recently identified location based on the most recently available GPS data and/or global position date determined based on the most recently detected feature. The dead reckoning calculation may make use of a count of number of revolutions 304 from the wheel encoder 314 and/or heading velocity data 320 and/or other motion parameters from sensor system 28 such as steering angle and/or map data 350 allowing a route being traverser by the vehicle to be determined. As such, the absolute positioning module 328 can determine global positioning data 330 directly from GPS data 302 and/or from inference from sensed and calculated vehicle motion data.

In embodiments, the predetermined map 308 comprises a navigation map including image data and/or road feature data. The image data may be optical camera data, lidar image data, radar image data and/or ultrasound image data. The image data may be two dimensional image data and/or three dimensional image data. The image data can be captured by a crowd of vehicles and/or captured by mapping vehicles for generating the predetermined map 308. The image data of the map 308 includes images of road features including any one or combination of road signs, road intersections, road curvatures, road lanes, road markings, road infrastructure (e.g. street lighting, traffic lights, traffic information signs, bridges), buildings, natural landmarks, road topology, etc. The predetermined map 308 correlates the road features and/or images thereof with global positioning coordinates such as GPS coordinates. For example, the predetermined map 308 may correlate road features and/or images with differential GPS data.

In various embodiments, the system 100 includes a road feature matching module 340 that is configured to match identified road features 306, which have been determined through the road feature identification module 322 based on image data 300 captured in the sensor system 28 of the vehicle 10. The road feature matching module 340 is configured to match identified road features 306 with mapped road features in the map data 350. In particular, a comparison of identified road features 306 with road features in the map data 350 is used in order to extract from the map data 350 global position data on matched road features 342 as an output for the road feature matching module 340. The road feature matching module may perform the comparison through an image comparison algorithm. The road feature matching module 340 can make use of a point cloud or pixel based comparison technique, an extracted feature comparison technique or a combination thereof. In one example, the road feature matching module 340 can operate iterative closest point analysis to match road features. The road feature matching module 340 is configured to seed the map search using the global position data 330 from the absolute positioning module 328. In this way, a focused search of the predetermined map 308 is implemented based on a current estimate of the vehicle location. Based on matching road features, global position data on matched road features 342 can be output, which is extracted from the global position data in the map 350, which correlates with images therein.

Should it occur that there are insufficient matching road features from image analysis, the road feature identification module and the road feature matching module may analyze other road features determinable from other data sources including sensors of the sensor system 28 other than image sensors. For example, steering angle, yaw rate sensor and vehicle speed can be used to determine road curvature and the predetermined map 308 or another navigation may can be accessed to determine road curvature in the map. Matching road curvatures will allow global location of the vehicle to be ascertained from map coordinates. Similarly, road curvature matching from other data non-image based data sources could also be utilized. Elevation matching could also be used to supplement road feature matching possibilities of the road feature matching module 340.

In various embodiments, the system 100 includes a refined global position determination module 344 that takes the global position data on matched road features 342 from the road feature matching module and relative position of the vehicle 10 to those matched road features. The relative position to the matched road features is included in the localization data 326 output from the localization module 324. The refined global position determination module 344 can triangulate the location of the vehicle 10 in real space based on the localization data 326 relative to the matched road features. Based on the triangulation and the data on the position of the matched road features 342, the refined global position determination module 344 is configured to determine and output refined global position data 308. The refined global position data 308 can have greater positional resolution than GPS data, thereby allowing more accurate wheel calibration. The wheel calibration module 310 is configured to receive the refined global position data 308 and estimate effective rolling radius as has been described above.

Additionally, or alternatively to a triangulation based method for determining refined global position data 308 is to determine a vector between the vehicle 10 and the at least one matched road feature 342. Based on the determined vector, the refined global position data 308 of the vehicle 10 is determined.

The modules of the system 100 and the positioning system 76 are provided as one example implementation thereof. Other arrangements and functionalities can be envisaged to achieve similar outcomes. In embodiments, a positioning system 76 is generally configured to determine road land marks and/or a road signature based on analysis of image data from sensor system 28 and match the road land marks and/or road signature from a visual odometry database or predetermined map 308 that is able to identify the global position of matched road land marks and/or road signature. Using triangulation of the vehicle 10 relative to the global position of the matched road land marks and/or road signature, refined global position data 308 is able to be determined for use in wheel calibration as described herein.

Figure 5:
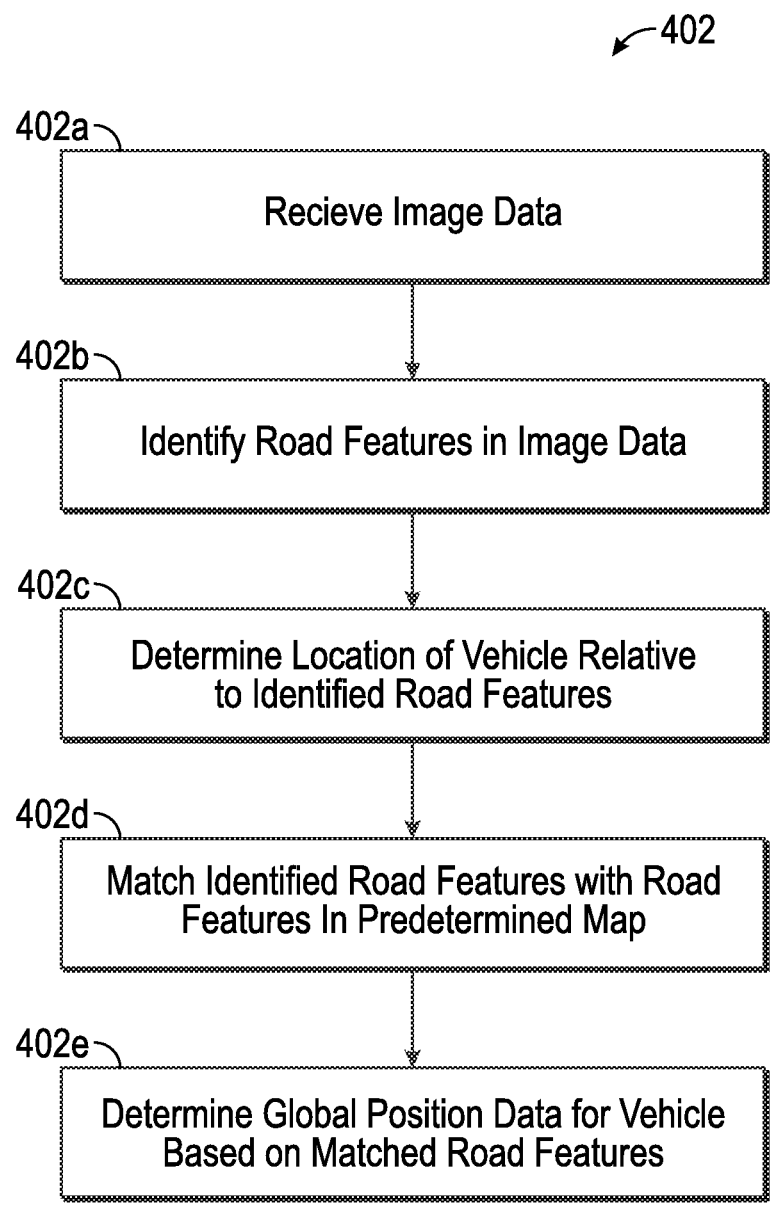
FIG. 5 is a flowchart illustrating a method for determining global position data for use in the method of FIG. 6, in accordance with various embodiments.

Referring now to FIGS. 5 and 6, and with continued reference to FIGS. 1-4, a flowchart illustrates a method 400 that can be performed by the system 100 of FIGS. 1 and 3 in accordance with the present disclosure. As can be appreciated in light of the disclosure, the order of operation within the method is not limited to the sequential execution as illustrated in FIGS. 5 and 6, but may be performed in one or more varying orders as applicable and in accordance with the present disclosure. In various embodiments, the method 400 can be scheduled to run based on one or more predetermined events, and/or can run continuously during operation of the vehicle 10.

In various embodiments, the method 400 includes a step 402 of receiving refined global position 308 data that is based on analysis of image data 300. The image data 300 is obtained from the sensor system 28. The image data 300 may be captured through the lidar device 326, the optical camera 324, through a radar imaging device and/or through an ultrasound imaging device. As will be discussed in greater detail with respect to FIG. 5, the image data 300 is analyzed through the positioning system 76 to identify road features (e.g. roadside features), which are matched to road features in the predetermined map 308. Based on the matched road features, refined global position data for the vehicle 10 can be determined based on global position data 330 extracted from the predetermined map 308 and based on a calculated location of the vehicle 10 relative to the matched road features (e.g. through triangulation, trilateration and other such relative position algorithms such as the vector method described above).

In embodiments, the method 400 includes a step 404 of using the refined global position data 308 to determine a first location of the vehicle 10.

In embodiments, the method 400 includes a step 406 of using the refined global position data 308 to determine at least a second location of the vehicle 10. The method can determine more than one further location of the vehicle 10 from the global position data 308 to allow motion of the vehicle 10 to be tracked. The resolution of sampling the refined global position data 308 can depend on availability of matched road features, whether the road is curved and other conditions.

In embodiments, the method 400 includes a step 408 of receiving a count of wheel revolutions between the first location of the vehicle 10 and the at least a second location of the vehicle from steps 406 and 408.

In embodiments, the method 400 includes a step 410 of calculating effective rolling radius for at least one wheel 16, 18 based on a distance travelled by the vehicle and the number of revolutions of the at least one wheel 16, 18 over the distance. The distance travelled is determined based on the first location of the vehicle 10 and the at least a second location of the vehicle 10. The distance travelled may be further determined using a navigation map stored on storage device 32 to allow the location of the vehicle 10 in the navigation map to be tracked along at least one mapped road, which can assist in taking into account road curvature in determining the distance travelled. Additionally or alternatively, steering angle, yaw rate, and heading velocity 320 can be taken into account to take into account road curvature in calculating the distance travelled. In embodiments, the step 410 includes determining wheel effective rolling radius for each wheel 16, 18.

In embodiments, the method 400 includes a step 412 of using the wheel effective rolling radius from step 410 in controlling the vehicle 10. For example, heading velocity 320 can be estimated based on the effective rolling radius, a count of revolutions of the respective wheel 16, 18 and time. The heading velocity 320 can form the basis for a number of further operations such as dead reckoning calculations, fuel economy calculations and reporting, vehicle speed reporting (e.g. through a user interface of the vehicle 10). Vehicle control functions based on the wheel effective rolling radius (or the heading velocity which is itself based on the wheel effective rolling radius) can include power control, braking control, steering control, etc.

FIG. 5 illustrates an exemplary division of step 402 of FIG. 4 into sub-steps for determining the refined global position data 308.

Step 402 includes a sub-step 402*a* of receiving image data 300, which can be lidar, radar, ultrasound, and/or optical image data from the sensor system 28. A further sub-step 402*b* is included for identifying road features 306 in the image data 300. Identification of road features can include image processing steps such as image segmentation and/or image filtration and feature classification. The feature classification can be performed through a neural network.

In sub-step 402*c*, the location, and optionally orientation, of the vehicle 10 relative to identified road features 306 is determined and included in output localization data 326. The sub-step 402*c* can include triangulation or trilateration or other relative localization methods for determining position of the vehicle 10 relative to the identified road features. In an alternative implementation, relative location sub-step 402*c* can be carried out relative to matched road features determined through sub-step 402*d* described below.

In sub-step 402*d*, identified road features 306 are matched with road features in the predetermined map 308. Sub-step 402*d* includes a comparison of identified road features with road features stored in the predetermined map. The comparison can involve classification and location comparison, image comparison, pixel or point cloud comparison and other comparison techniques. In particular, a set of identified road features 306 have a relative position, classification and image properties forming a feature signature. The signature of identified road features 306 is matched to a corresponding signature in the predetermined map 308. From this data 342 representing the matched road features is output, such as position data.

In embodiments, sub-step 402*d* focuses the search for the identified road features or signature in the predetermined map 308 by searching around a probable location of the vehicle in the navigation map. In particular, global position data 330 for the vehicle 10 is used as seed data for the map search. The global position data 330 can be received from the GPS receiver 326 and/or inferred from most recently obtained global position data (e.g. GPS data), heading velocity 320, steering wheel angle and optionally also from other vehicle motion sensors and through tracking in a navigation map.

In sub-step 402*e*, refined global position data 308 for the vehicle 10 is determined based on the matched road features (or feature signatures from sub-step 402*d*). In particular, the matched road features correlate to global position data in the predetermined map 308, which is combined with localization data 326 that positions and orients the vehicle 10 relative to the matched road features, thereby allowing refined global position data to be determined.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for controlling at least one function of a vehicle, the system comprising:
at least one positioning module configured to receive image data of a surroundings of the vehicle, to determine localization data for the vehicle based on an analysis of the image data to identify at least one road feature and to match the at least one identified road feature with at least one road feature in a predetermined map, and to determine a distance traveled based on the localization data, via at least one processor,
wherein the at least one positioning module is configured to, in response to determining that the vehicle is traveling on a straight road, using two samples of the localization data to determine the distance travelled, and in response to determining that the vehicle is traveling on a curvy road, using a high resolution of samplings of the localization data with a curving fitting method to determine the distance travelled;
at least one wheel calibration module configured to estimate effective rolling radius of at least one wheel of the vehicle based on the distance travelled, via at least one processor; and
a vehicle control system configured to control at least one function of the vehicle based, in part, on the effective rolling radius.

2. The system of claim 1, wherein the image data comprises lidar data, radar data, ultrasound data, visual data, stereoscopic camera data, camera data or a fusion of at least two thereof.

3. The system of claim 1, wherein the predetermined map correlates global positioning system, GPS, data with image data that includes images of road features.

4. The system of claim 1, wherein the at least one positioning module utilizes a feature matching algorithm that compares road features in images of the predetermined map with identified road features.

5. The system of claim 4, wherein the feature matching algorithm uses a point cloud or pixel based comparison technique, an extracted feature comparison technique or a combination thereof.

6. The system of claim 1, wherein the at least one wheel calibration module is configured to receive revolution data for the at least one wheel and to determine the effective wheel radius based on the revolution data and global position data.

7. The system of claim 1, wherein the at least one positioning module is configured to receive global positioning system, GPS, data representing a GPS position of the vehicle and is configured to refine the GPS position of the vehicle based on localization data determined from the image analysis.

8. The system of claim 1, wherein the at least one positioning module is configured to triangulate or otherwise calculate a position of the vehicle relative to road features through the analysis of the image data as part of determining localization data, wherein the at least one positioning module is configured to register road features of the image data with road features in a predetermined map to determine registration data and to locate the vehicle in the predetermined map based on the localization data and the registration data to allow determination of the global positioning data for the vehicle.

9. The system of claim 1, wherein the at least one positioning module is configured to calculate velocity of the vehicle using the effective rolling radius and a number of revolutions of the at least one wheel, wherein the vehicle control system is configured to control at least one function of the vehicle based, in part, on the calculated velocity.

10. The system of claim 1, wherein the vehicle control system is configured to control, based on the effective rolling radius, at least one of: a steering control actuator, a shifter control actuator, a throttle control actuator, a brake control actuator and a speed user interface.

11. A vehicle, comprising:
a sensor system configured to obtain image data of a surroundings of the vehicle;
at least one positioning module configured to, via a processor, determine localization data for the vehicle based on an analysis of the image data to identify at least one road feature and to match the at least one identified road feature with at least one road feature in a predetermined map, and determine a distance traveled based on the localization data, via at least one processor,
wherein the at least one positioning module is configured to, in response to determining that the vehicle is traveling on a straight road, using two samples of the localization data to determine the distance travelled, and in response to determining that the vehicle is traveling on a curvy road, using a high resolution of samplings of the localization data with a curving fitting method to determine the distance travelled;
at least one wheel calibration module configured to, via a processor, estimate effective rolling radius of at least one wheel of the vehicle based on the distance travelled, via at least one processor; and
a vehicle control system configured to control at least one function of the vehicle based on the effective rolling radius,
wherein the sensor system comprises a global positioning system, GPS, receiver configured to determine global positioning system data, wherein the at least one positioning module is configured to refine the GPS data based on the image analysis.

12. The vehicle of claim 11, wherein the image analysis identifies road features in the image data, and determines localization data representing a location of the vehicle relative to the road features, wherein the positioning module is configured to match the identified road features with road features in a predetermined map that correlates global position data with road features, wherein the positioning system is configured to determine the global position data based on the matched road features and the localization data.

13. The vehicle of claim 11, wherein the sensor system comprises a wheel encoder configured to count revolutions of the at least one wheel to thereby determine count data, wherein the at least one wheel calibration module is configured to estimate effective rolling radius from a distance that the at least one wheel has moved between first and second locations using the distance travelled and a number of revolutions of the at least one wheel between the first and second locations using the count data.

14. A method of controlling at least one function of a vehicle, the method comprising:
receiving, via at least one processor, image data of a surroundings of the vehicle;
performing, via at least one processor, image analysis on the image data to identify at least one road feature;
matching, via at least one processor, the at least one identified road feature to at least one road feature in a predetermined map to determine at least one matched road feature;
triangulating or otherwise calculating a position of the vehicle relative to at least one identified road feature to obtain localization data;
determining, via at least one processor, global positioning data for the vehicle based on the at least one matched road feature, the localization data and global positioning data in the predetermined map;
determining, via at least one processor, a distance travelled based on the global positioning data, wherein in response to determining that the vehicle is traveling on a straight road, using two samples of the localization data to determine the distance travelled, and in response to determining that the vehicle is traveling on a curvy road, using a high resolution of samplings of the localization data with a curving fitting method to determine the distance travelled;
calibrating, via at least one processor, effective rolling radius of at least one wheel of the vehicle based on the distance travelled; and
controlling, via at least one processor, at least one function of the vehicle based, in part, on the effective rolling radius.

15. The method of claim 14, wherein the at least one road feature is identified through a neural network.

* * * * *